United States Patent
Gu et al.

(10) Patent No.: US 9,727,160 B2
(45) Date of Patent: Aug. 8, 2017

(54) DISPLACEMENT DETECTION DEVICE AND OPERATING METHOD THEREOF

(71) Applicant: PixArt Imaging Inc., Hsin-Chu County (TW)

(72) Inventors: Ren-Hau Gu, Hsin-Chu County (TW); Yu-Hao Huang, Hsin-Chu County (TW); Hsin-Chia Chen, Hsin-Chu County (TW); Yen-Min Chang, Hsin-Chu County (TW)

(73) Assignee: PixArt Imaging Inc., Hsin-Chu County (TW)

( * ) Notice: Subject to any disclaimer, the term of this patent is extended or adjusted under 35 U.S.C. 154(b) by 131 days.

(21) Appl. No.: 13/632,381

(22) Filed: Oct. 1, 2012

(65) Prior Publication Data

US 2013/0113759 A1    May 9, 2013

(30) Foreign Application Priority Data

Nov. 4, 2011   (TW) .............................. 100140263 A (51) Int. Cl.
*G06F 3/041* (2006.01)
*G06F 3/042* (2006.01)
*G06F 3/0354* (2013.01)

(52) U.S. Cl.
CPC ........ *G06F 3/0416* (2013.01); *G06F 3/03547* (2013.01); *G06F 3/0421* (2013.01)

(58) Field of Classification Search
CPC ...... G06F 3/033; G06F 1/3206; G06F 1/3259; G06F 3/03543; G06F 3/038; G06K 9/2027; G06K 2009/3291; Y02B 60/1253; Y02B 60/148
USPC .................................................. 345/163–166
See application file for complete search history.

(56) References Cited

U.S. PATENT DOCUMENTS

| | | | |
|---|---|---|---|
| 7,313,255 B2 | 12/2007 | Machida et al. | |
| 2002/0030668 A1 | 3/2002 | Hoshino et al. | |
| 2005/0110746 A1 | 5/2005 | Hou | |
| 2007/0132734 A1* | 6/2007 | Kwak et al. | 345/166 |
| 2009/0195505 A1* | 8/2009 | Chen et al. | 345/166 |
| 2010/0073327 A1 | 3/2010 | Mau et al. | |
| 2010/0220077 A1* | 9/2010 | Fukunaga et al. | 345/175 |

FOREIGN PATENT DOCUMENTS

CN    101561720 A    10/2009

* cited by examiner

*Primary Examiner* — Nelson Rosario
(74) *Attorney, Agent, or Firm* — Hauptman Ham, LLP (57) ABSTRACT

There is provided a displacement detection device including a light source, an image sensor and a processing unit. The light source provides light to a finger with a light source parameter. The image sensor receives reflected light from the finger, outputs valid images when the light source is being turned on and outputs dark images when the light source is being turned off. The processing unit determines a contact status according to one of the dark images and one of the valid images, and calculates a displacement according to two of the valid images to accordingly adjust the light source parameter.

17 Claims, 5 Drawing Sheets

| | effective frame rate (FPS) | max.detectable speed (IPS) |
|---|---|---|
| H speed | 2385 | 30.05 |
| M speed | 1193 | 15.02 |
| L speed | 795 | 10.02 |

| | effective frame rate (FPS) | max.detectable speed (IPS) |
|---|---|---|
| H speed | 1590 | 20.03 |
| M speed | 795 | 10.02 |
| L speed | 795 | 10.02 |

| | effective frame rate (FPS) | max.detectable speed (IPS) |
|---|---|---|
| H speed | 1193 | 15.03 |
| M speed | 596 | 7.51 |
| L speed | 795 | 10.02 |

DISPLACEMENT DETECTION DEVICE AND OPERATING METHOD THEREOF

CROSS REFERENCE TO RELATED APPLICATION

This application claims the priority benefit of Taiwan Patent Application Serial Number 100140263, filed on Nov. 4, 2011, the full disclosure of which is incorporated herein by reference.

BACKGROUND

1. Field of the Disclosure

This disclosure generally relates to a displacement detection device and operating method thereof and, more particularly, to a displacement detection device and operating method thereof that can reduce the system power consumption.

2. Description of the Related Art

Portable electronic devices are popular nowadays for their excellent operating convenience. Most portable electronic devices provide a display screen for a user to watch various application programs and an optical mouse, e.g. an optical finger mouse, for the user to control a cursor or to select an application program to be executed. Reducing the power consumption of the optical mouse is a way to reduce the total power consumption of the portable electronic devices.

Conventionally, it is able to reduce the power consumption of an optical mouse by changing an image capture frequency of the image sensor thereof. For example, U.S. publication No. 20050110746, entitled "Power-saving method for an optical navigation device", discloses a method for controlling the image capture frame rate of an image sensor according to a moving speed, i.e. variations of a horizontal displacement and a vertical displacement per unit time, of an optical navigation device, wherein when the moving speed is faster, the image capture frame rate becomes higher and the exposure time of the image sensor becomes shorter; on the contrary, when the moving speed is slower, the image capture frame rate becomes lower and the exposure time of the image sensor becomes longer. In this manner, the total power consumption of the optical navigation device can be reduced.

However, the above method, which can reduce the power consumption of an optical navigation device by adjusting the image capture frame rate and the exposure time of an image sensor, still has following problems. (1). Since the exposure time of the image sensor changes with the moving speed of the optical navigation device, the brightness of captured images appears large fluctuation to reduce the stability. (2). Although the image capture frame rate is decreased with the decreasing of the moving speed of the optical navigation device, a sensing region of the image sensor has to be increased so that the maximum detectable acceleration obtained under a low moving speed can be maintained equal to that obtained under a high moving speed. Therefore, the loading of the digital signal processor included in the optical navigation device will not linearly decrease with the decreasing of the image capture frame rate.

Accordingly, the present disclosure provides a displacement detection device and operating method thereof that may control the lighting of a light source according to the detected displacement and eliminate interference from ambient light. Furthermore, the displacement detection device may enter a standby state when no object is detected within a predetermined time interval so as to further save power consumption.

SUMMARY

The present disclosure provides a displacement detection device and operating method thereof that effectively reduces the system power consumption.

The present disclosure further provides a displacement detection device and operating method thereof that eliminates interference from ambient light.

The displacement detection device of the present disclosure is configured to detect a contact status and a displacement between a finger and a touch interface.

The present disclosure provides a displacement detection device including a touch interface, a light source, an image sensor and a processing unit. The light source is configured to provide light to the touch interface with a light source parameter. The image sensor is configured to receive reflected light from the touch interface at a sampling frequency to output valid images when the light source is being turned on and output dark images when the light source is being turned off. The processing unit is configured to identify a contact status between a finger and the touch interface according to one of the dark images and one of the valid images, and to calculate the displacement according to two of the valid images to accordingly adjust the light source parameter.

The present disclosure further provides an operating method of a displacement detection device including the steps of: using a light source to illuminate a touch interface with a light source parameter; using an image sensor to receive reflected light from the touch interface at a sampling frequency to output valid images when the light source is being turned on and output dark images when the light source is being turned off; using a processing unit to calculate a static parameter according to one of the valid images and one of the dark images; and using the processing unit to identify the contact status according to a parameter difference between the static parameter and a predetermined parameter.

The present disclosure further provides a displacement detection device including a touch interface, a light source, an image sensor and a processing unit. The light source is configured to provide light to the touch interface with a light source parameter. The image sensor is configured to receive reflected light from the touch interface at a sampling frequency to output valid images when the light source is being turned on and output dark images when the light source is being turned off. The processing unit is configured to calculate a brightness difference between one of the valid images and one of the dark images, and identifies a contact status between a finger and the touch interface according to a difference between the brightness difference and a predetermined brightness difference.

In the displacement detection device and the operating method of the present disclosure, the second threshold may be smaller than the first threshold in order to prevent the frequent change of the contact status between two states. The light source parameter includes a speed mode (or a lighting frequency), a skip number and/or an exposure parameter. The static parameter and the predetermined parameter may be brightness values, quality parameters and/or other parameters for representing the image characteristic. The parameter difference may be a ratio or a difference between the static parameter and the predetermined parameter, wherein the predetermined parameter may be previously obtained in the starting procedure of the system or according to an instruction in operation when the finger is not in contact with the touch interface.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
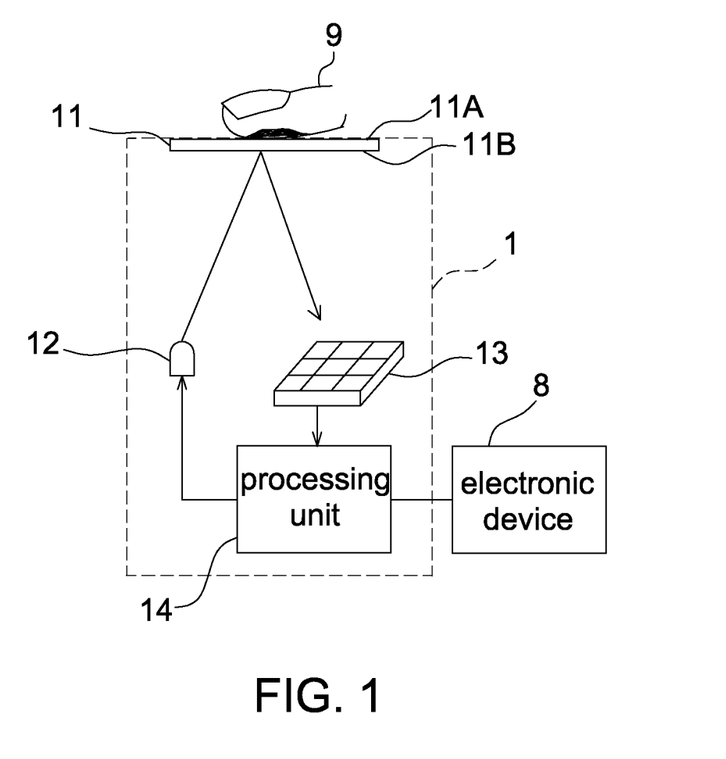
FIG. 1 shows a schematic diagram of the displacement detection device according to an embodiment of the present disclosure.

Please refer to FIG. 1, it shows a schematic diagram of the displacement detection device 1 according to an embodiment of the present disclosure. The displacement detection device 1 includes a touch interface 11, a light source 12, an image sensor 13 and a processing 14.

The touch interface 11 has a first surface 11A and a second surface 11B. The first surface 11A is served as an operation interface and a user may use his or her finger(s) to touch the first surface 11A or to move thereon. The touch interface 11 may be made of suitable material that is transparent to the light irradiated by the light source 12.

The light source 12 may irradiate invisible light, such as infrared light, and is configured to irradiate light corresponding to the image capturing of the image sensor 13. The light source 12 provides light to the second surface 11B of the touch interface 11. When the finger 9 is in contact with the first surface 11A, the light from the light source 12 is reflected. When the finger 9 is not in contact with the first surface 11A, the light from the light source 12 penetrates the touch interface 11 and leaves the displacement detection device 1.

The image sensor 13 captures reflected light from the touch interface 11 (more specifically from the finger 9) at a fixed sampling frequency to generate valid images or dark images, wherein said valid images are referred to the images captured by the image sensor 13 when the light source 12 is being turned on; and said dark images are referred to the images captured by the image sensor 13 when the light source 12 is being turned off. FIG. 1 shows a sensing array of the image sensor 13 to represent the image sensor 13, but it is only an example. It is appreciated that other optical components (not shown) may be included inside or outside the image sensor 13 so as to improve the sensing efficiency thereof.

The processing unit 14 receives the valid images and the dark images outputted from the image sensor 13, calculates a static parameter according to one of the dark images and one of the valid images to accordingly identify a contact status, calculates a displacement of the finger 9 with respect to the touch interface 11 according to two of the valid images and adjusts an exposure parameter according to an image content of at least one valid image. In the present disclosure, the processing unit 14 may identify the contact status (described later) between the finger 9 and the first surface 11A according to a parameter difference between the static parameter and a predetermined parameter, wherein when the contact status is in a non-contact state for a predetermined time interval, the displacement detection device 1 enters a sleep mode; and when the contact status is a contact state, a displacement is calculated so as to accordingly adjust a light source parameter. The processing unit 14 further adjusts the exposure parameter, e.g. an exposure time and an image gain, according to the image content, e.g. the image brightness or image quality, of at least one valid image. It is appreciated that the processing unit 14 may further include a storage unit configured to store the predetermined parameter or related parameters, and further include a counting unit configured to count the predetermined time interval. The processing unit 14 may control the lighting of the light source 12 directly or though a light control unit.

The processing unit 14 further transmits the obtained displacement or other control parameters to an electronic device 8 for corresponding controls, wherein the functions that the processing unit 14 controls the electronic device 8 may be those of general human interface devices and thus details thereof will not be described herein.

Figure 2A:
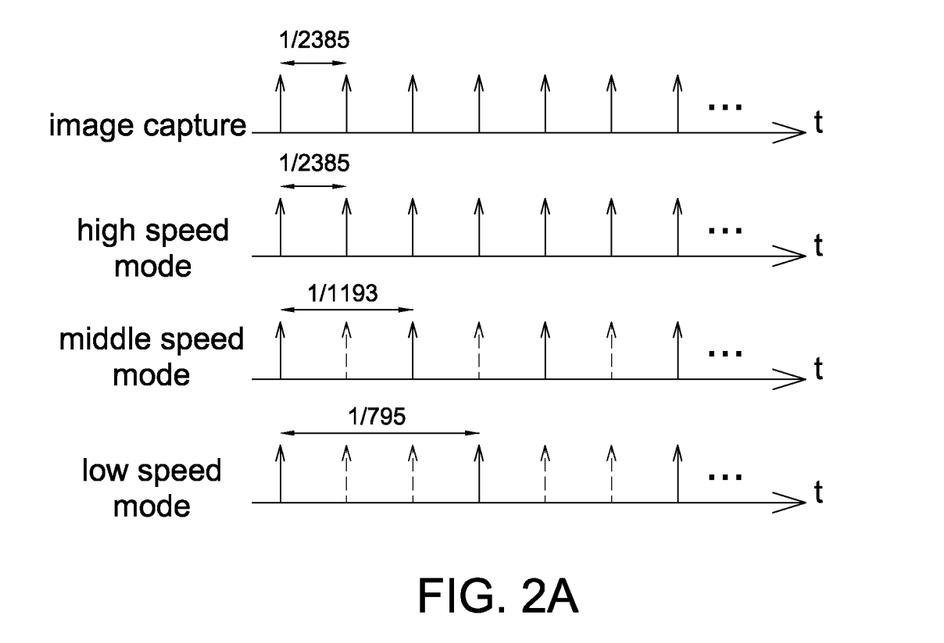
FIG. 2A shows a schematic diagram of different speed modes of the displacement detection device according to the embodiment of the present disclosure.

Please refer to FIG. 2A, it shows a timing diagram of the image capturing of the image sensor 13 and three lighting modes of the light source 12 according to an embodiment of the present disclosure, wherein each of the lighting modes is associated with one lighting frequency. In this embodiment, it is assumed that a sampling period is 1/2,385 second, a lighting period of high speed mode is 1/2,385 second, a lighting period of middle speed mode is 1/1,193 second, and a lighting period of low speed mode is 1/759 second, wherein the lighting periods may be integer times of and synchronizing to the sampling period such that the light source 12 may provide the light needed in image capturing when the image sensor 13 is capturing images. Accordingly, although the image sensor 13 captures images with a fixed sampling period, as the light source 12 is controlled by the processing unit 14 and does not provide the light needed in image capturing each time that the image sensor 13 captures an image, the valid images captured by the image sensor 13 is actually controlled by the lighting period of the light source 12. The processing unit 14 calculates a displacement according to the valid images captured by the image sensor 13. It is appreciated that the sampling period, the lighting periods and the values thereof shown in FIG. 2A are only exemplary and not used to limit the present disclosure.

Figure 2B:
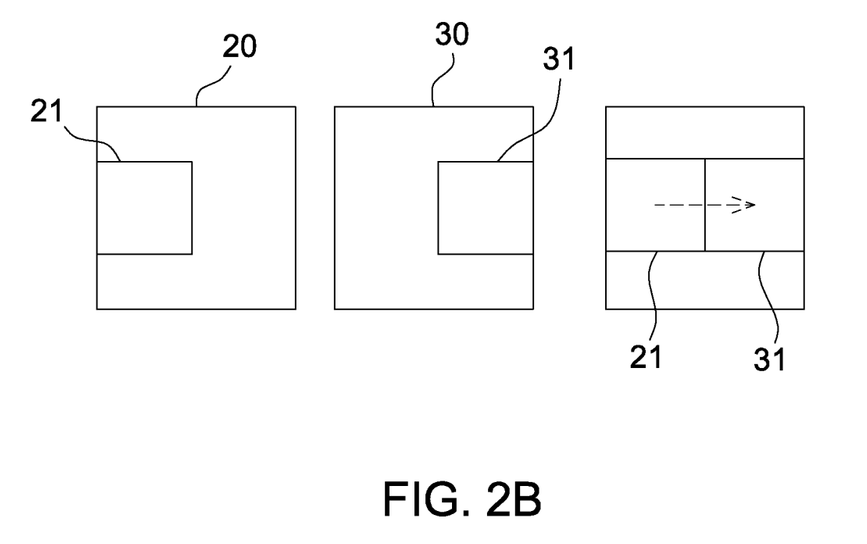
FIG. 2B shows a schematic diagram of calculating the maximum detectable displacement by the displacement detection device according to the embodiment of the present disclosure.

Please refer to FIGS. 2A and 2B, the maximum detectable displacement and the maximum detectable speed between two valid images that can be calculated by the processing unit 14 will be illustrated hereinafter. In one embodiment, the image sensor 13 captures two valid images associated with the turning on of the light source 12, such as a first image 20 and a second image 30. The processing unit 14 selects a reference search block 21 in the first image 20 and selects a search block 31 in the second image 30. The processing unit 14 then calculates a displacement between the reference search block 21 and the search block 31 to be served as the displacement detected by the displacement detection device 1. For simplifying the illustration, only the X-axis component of the displacement (i.e. the horizontal direction in the figure) is considered in FIG. 2B, and the displacement may include X-axis component and Y-axis component in actual operation. The maximum detectable displacement may be obtained when the reference search block 21 is located at the leftmost side of the first image 20 and the search block 31 is located at the rightmost side of the second image 30 as shown in FIG. 2B. In this embodiment, it is assumed that each image frame has 16×16 pixels (i.e. a size of the sensing array of the image sensor is 16×16), and the search block 31 and the reference search block 21 have 8×8 pixels. Therefore, the maximum detectable displacement that the processing unit 14 can detect between two successive valid images is 8-pixels distance (i.e. a maximum detectable pixel number is 8). As this maximum detectable displacement is determined by the size of every image frame, it will not be affected by the lighting period of the light source 12; that is, the maximum detectable displacement is identical associated with every lighting period of the light source 12.

Accordingly, when the displacement of the displacement detection device 1 between two successive valid images exceeds 8-pixels distance, the light source 12 has to shorten the lighting period such that the processing unit 14 is able to detect the displacement. In other words, when the displacement of the displacement detection device 1 exceeds the maximum detectable displacement, the processing unit 14 is not able to calculate the displacement, and thus it is necessary to shorten the lighting period of the light source 12 in order to allow the displacement detection device 1 to operate normally. Therefore, in this disclosure the processing unit 14 may control the light source 12 to enter the high speed mode, middle speed mode or low speed mode according to the calculated displacement. It is appreciated that all values used in the present disclosure are only exemplary and not used to limit the present disclosure.

Figure 2C:
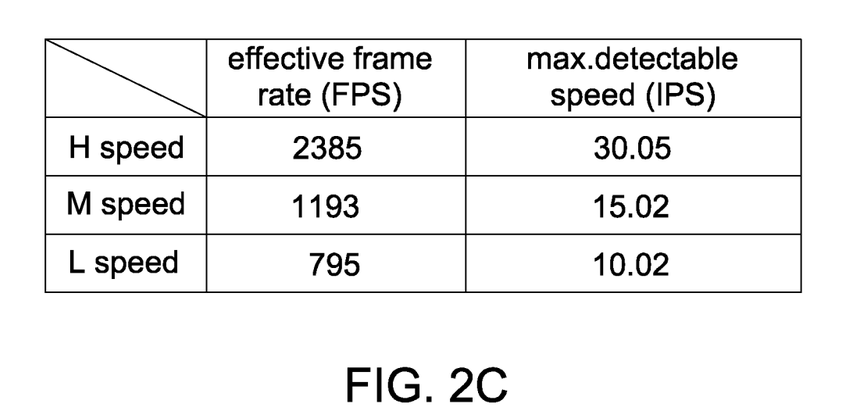
FIG. 2C shows the maximum detectable speed associated with different speed modes of the displacement detection device according to the embodiment of the present disclosure.

However, the maximum detectable speed is different associated with different speed modes. For example, if a size of every pixel is 40×40 micrometer, the maximum detectable speed in each speed mode is equal to the maximum detectable pixel number×the pixel size×the frame rate. Therefore, the maximum detectable speed is equal to 8×40×2385=30.05 inches/second (IPS) in high speed mode. Similarly, the maximum detectable speeds in the middle speed mode and the low speed mode can be obtained as FIG. 2C, wherein the effective frame rate is corresponding to the lighting frequency of the light source 12.

Figure 3A:
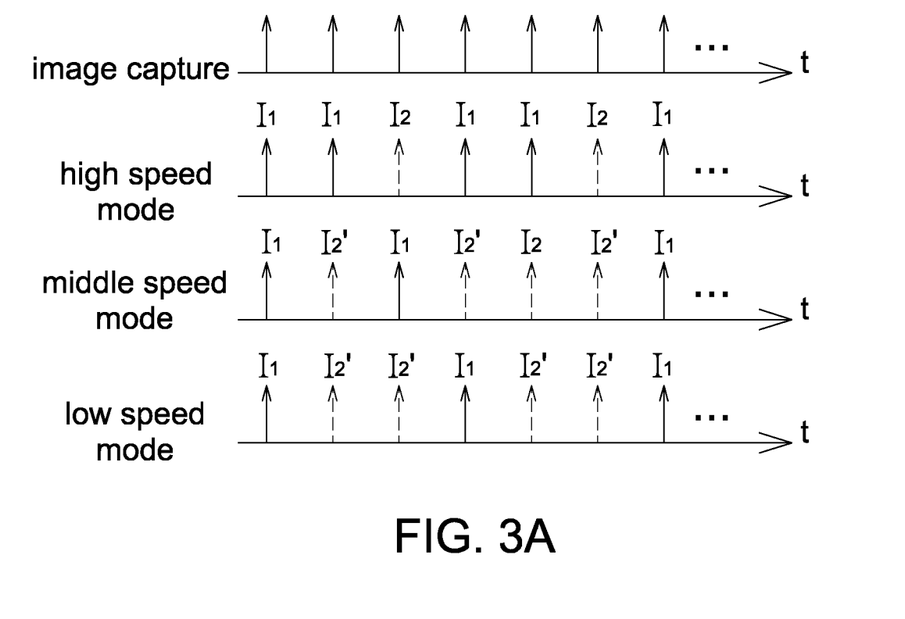
FIG. 3A shows a schematic diagram of the skip mode of different speed modes of the displacement detection device according to the embodiment of the present disclosure.
Figure 3B:
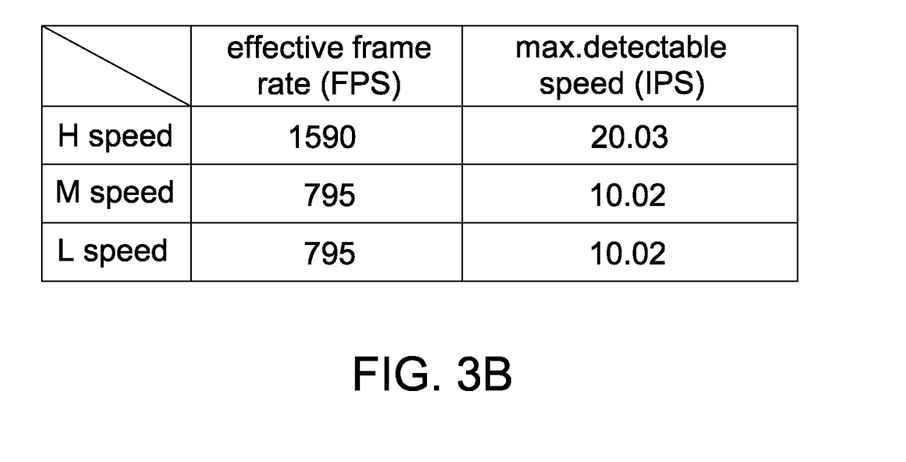
FIG. 3B shows the maximum detectable speed associated with the skip mode of different speed modes shown in FIG. 3A.

Please refer to FIGS. 3A and 3B, they show schematic diagrams of the effective frame rate changed by the displacement detection device 1 according to the detected displacement. In this embodiment, in addition to the high speed, middle speed and low speed modes, in each speed mode the processing unit 14 may further enter a skip mode according to the detected moving speed (or displacement). When the moving speed detected by the processing unit 14 does not exceed a speed threshold, the light source 12 may skip one image without being turned on after two successive valid images being captured so as to save power consumption. For example in high speed mode, the effective frame rate is reduced to ⅔ of the original effective frame rate, i.e. 2385×⅔=1590 (FPS) by skipping one valid image without providing light; that is, a valid image becomes a dark image since the light source 12 skips the lighting. Therefore, the maximum detectable speed in high speed mode is changed to 8×40×1590=20.03 inches/second. Similarly, the maximum detectable speeds in other speed modes are shown in FIG. 3B, wherein no valid image is skipped in the low speed mode herein, but the present disclosure is not limited thereto.

Figure 4A:
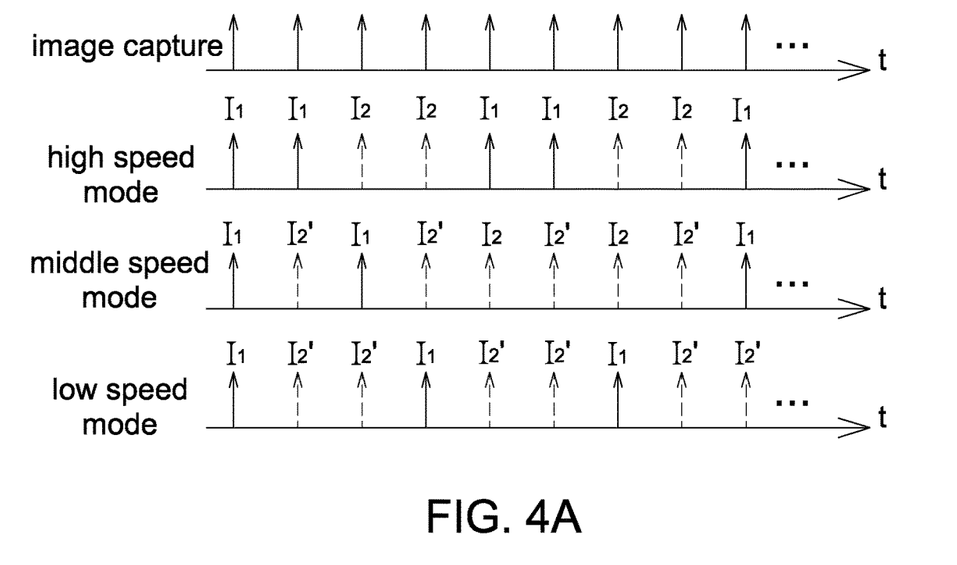
FIG. 4A shows another schematic diagram of the skip mode of different speed modes of the displacement detection device according to the embodiment of the present disclosure.
Figure 4B:
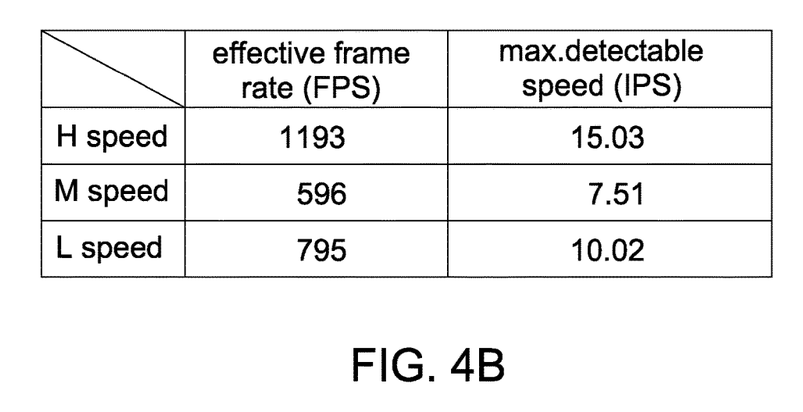
FIG. 4B shows the maximum detectable speed associated with the skip mode of different speed modes shown in FIG. 4A.

Please refer to FIGS. 4A and 4B, they show other schematic diagrams of the effective frame rate changed by the displacement detection device 1 according to the detected displacement. In this embodiment, two valid images (e.g. $I_2$) are skipped in the skip mode, and the maximum detectable speed at every speed mode is shown in FIG. 4B, wherein no valid image is skipped in the low speed mode herein. In other words, in the present disclosure when the processing unit 14 identifies that the detected displacement is relatively low or the moving speed is relatively slow enough to decease the effective frame rate, the processing unit 14 selects to enter a lower speed mode or the skip mode; that is, the light source parameter of the light source 12 may include a speed mode (i.e. the light frequency), a skip number and/or an exposure parameter, wherein the exposure parameter may include an exposure time, an aperture value and an amplification gain. For example in high speed mode, the processing unit 14 may select to enter the middle speed mode, the low speed mode or the skip mode. The merit of adding the skip mode is to improve the adjustable resolution of the effective frame rate, and the skipped valid images may be used in the post-processing illustrated below to eliminate interference from ambient light. In addition, a skip number in the skip mode may be determined according to the maximum detectable speed associated with the light source parameter and the detected current moving speed (or displacement). In FIGS. 3A and 4A, $I_2$ denotes dark images associated with the skip mode (i.e. skipped valid images); $I_2'$ denotes dark images in the normal high speed, meddle speed and low speed modes; and $I_1$ denotes valid images.

Figure 5A:
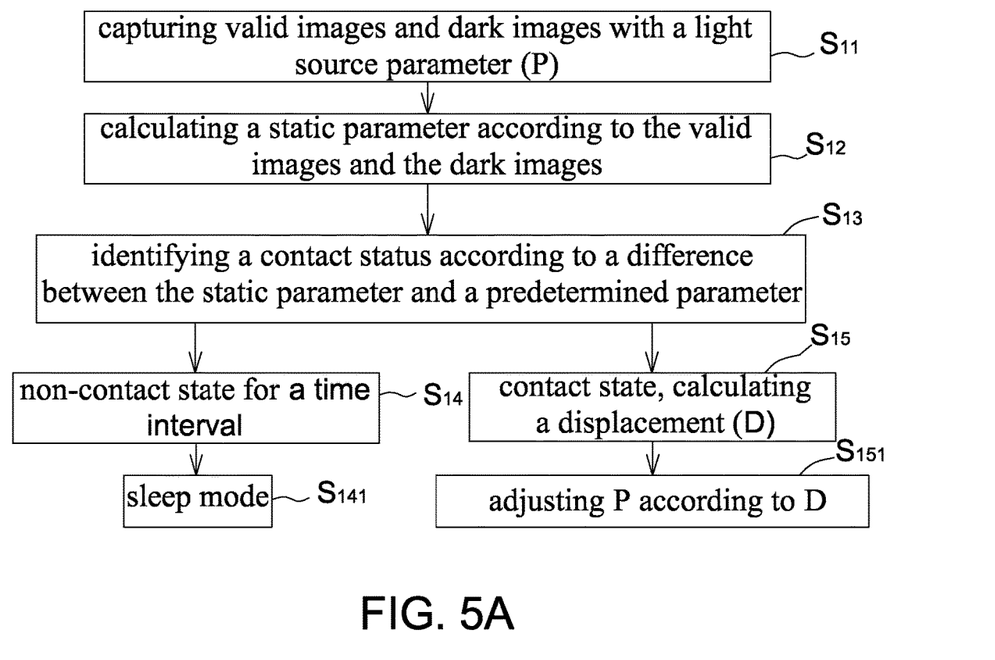
FIG. 5A shows a flow chart of the operating method of the displacement detection device according to the embodiment of the present disclosure.
Figure 5B:
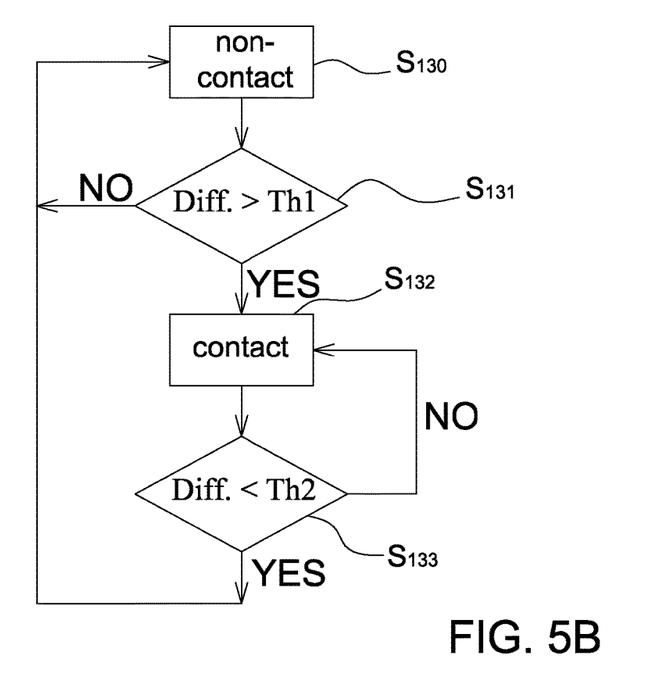
FIG. 5B shows a flow chart of identifying a contact status in FIG. 5A.

Please refer to FIGS. 5A and 5B, they show flow charts of the operating method of the displacement detection device according to the embodiment of the present disclosure, which includes the steps of: capturing valid images and dark images with a light source parameter (Step $S_{11}$); calculating a static parameter according to one of the valid images and one of the dark images (Step $S_{12}$); identifying a contact status according to a parameter difference between the static parameter and a predetermined parameter (Step $S_{13}$); when the contact status is in a non-contact state for a predetermined time interval (Step $S_{14}$), entering a sleep mode (Step $S_{141}$); when the contact status is a contact state, calculating a displacement (Step $S_{15}$) and adjusting the light source parameter according to the displacement (Step $S_{151}$); wherein in the Step $S_{13}$ of identifying the contact status, the contact state or the non-contact state (FIG. 5B) is identified according to a comparison result of comparing the parameter difference with at least one threshold.

Step $S_{11}$:

Please refer to FIGS. 1, 3A and 5A together, the processing unit 14 controls the light source 12 to illuminate the second surface 11B of the touch interface 11 with a light source parameter initially, e.g. in a high speed mode and skip one image as shown in FIG. 3A. The image sensor 13 receives reflected light from the touch interface 11 at a sampling frequency so as to output valid images $I_1$ (corresponding to the turning on of the light source 12) and dark images $I_2$ (corresponding to the turning off of the light source 12), wherein if the light source 12 lights in the middle speed mode, the dark images may be any of the images captured when the light source 12 is being turned off (i.e. $I_2$ or $I_2'$), and is not limited to the dark image $I_2$.

Step $S_{12}$:

The processing unit 14 then calculates a static parameter according to a differential image between the valid image $I_1$ and the dark image $I_2$. For example, when the finger 9 is substantially in contact with the first surface 11A of the touch interface 11, the valid images $I_1$ captured by the image sensor 13 contain components of (reflected light from finger+stray light+ambient light), and dark images $I_2$ only contain components of (ambient light). Therefore, the interference from ambient light is eliminated by calculating a difference, i.e. a differential image, between the valid image $I_1$ and the dark image $I_2$. Similarly, when the finger 9 is not in contact with the touch interface 11, the valid images $I_1$ captured by the image sensor 13 contain components of (stray light+ambient light), and the dark image $I_2$ only contain components of (ambient light). Therefore, the interference from ambient light is also eliminated by calculating a difference between the valid image $I_1$ and the dark image $I_2$. In one embodiment, the static parameter may be obtained according to the following equations:

$$I_1 - I_2 \quad (1)$$

$$(I_1 - I_2)/\text{first exposure time} \quad (2)$$

$$(I_1/\text{first exposure time}) - (I_2/\text{second exposure time}) \quad (3)$$

$$QI_1 - QI_2 \quad (4)$$

$$(QI^1 - QI_2)/\text{first exposure time} \quad (5)$$

$$(QI_1/\text{first exposure time}) - (QI_2/\text{second exposure time}) \quad (6)$$

wherein $I_1$ and $I_2$ denote brightness values or average brightness values (i.e. gray levels) and $(I_1 - I_2)$ denotes a brightness difference or an average brightness difference; $QI_1$ and $QI_2$ denote quality parameters; first exposure time denotes an exposure time of the image senor 13 corresponding to the turning on of the light source 12; second exposure time denotes an exposure time of the image sensor 13 corresponding to the turning off of the light source 12, wherein a purpose of dividing the brightness values and the quality parameters by the exposure time is to normalize the static parameter.

Step $S_{13}$:

The processing unit 14 then calculates a parameter difference between the static parameter obtained in the Step $S_{12}$ and a predetermined parameter so as to identify a contact status between the finger 9 and the touch interface 11. In this embodiment, the predetermined parameter is a predetermined static parameter previously obtained when the finger 9 is not in contact with the touch interface 11, and the predetermined parameter may also be obtained according to equations (1) to (6). For example, the predetermined static parameter is preferably previously obtained in the starting procedure of the system or according to an instruction of the user after the starting procedure is accomplished or may be previously stored in the system. In this embodiment, the parameter difference may be a ratio or a difference between the static parameter and the predetermined parameter. For example, the parameter difference may be a brightness ratio between the static parameter and the predetermined parameter when both the static parameter and the predetermined parameter are brightness values. For example, the parameter difference may be a quality parameter difference between the static parameter and the predetermined parameter when both the static parameter and the predetermined parameter are quality parameters, but not limited thereto.

The method of identifying whether the finger 9 is in contact with the touch interface 11 may compare the parameter difference with at least one threshold. In one embodiment, since the images captured by the image sensor 13 are affected by several factors such as the temperature deviation, deviation of fabrication and finger difference, the finger 9 is identified to be substantially in contact with the touch interface 11 when the static parameter is 1.5 times, preferably 2 times, larger than the predetermined parameter; i.e. said 1.5 or 2 times may be served as the threshold herein. In addition, when the static parameter and the predetermined parameter are quality parameters, the setting of the threshold may be determined according to different types of the parameter.

Steps $S_{130}$ to $S_{133}$:

For example when the finger 9 is in the non-contact state (Step $S_{130}$) and the processing unit 14 identifies that the parameter difference is larger than a first threshold (e.g. the brightness ratio is larger than 2 times), the finger 9 is identified to be in contact with the touch interface 11 (Steps $S_{131}$ to $S_{132}$) and thus enter the contact state. If the processing unit 14 identifies that the parameter difference is smaller than the first threshold (e.g. the brightness ratio is smaller than 2 times), the finger 9 is identified to be not in contact with the touch interface 11 and thus return to Step $S_{130}$. For example when the finger 9 is in the contact state (Step $S_{132}$) and the processing unit 14 identifies that the parameter difference is smaller than a second threshold (e.g. the brightness ratio is smaller than 1.5 times), the finger is identified to leave the touch interface 11 and thus return to Step $S_{130}$ (Steps $S_{132}$ to $S_{133}$). If the processing unit 14 identifies that the parameter difference is still larger than the second threshold (i.e. the brightness ratio is larger than 1.5 times), the finger 9 is identified to be in contact with the touch interface 11 and thus keep in the Step $S_{132}$ It is appreciated that the second threshold may be selected to be smaller than the first threshold in order to prevent the contact status from frequent changing between the contact state and the non-contact state, but it is possible to use only one threshold. In addition, the values of the first threshold and the second threshold are only exemplary herein.

Steps $S_{14}$ to $S_{141}$:

When the contact status is identified in the non-contact state for a predetermined time interval according to the Steps $S_{130}$ to $S_{133}$, it is able to identify that the user does not operate the displacement detection device 1 and to enter the sleep mode to save power consumption, wherein the definition of the sleep mode is well known an thus details thereof will not be described herein. In addition, the predetermined time interval may be set according to actual requirements and does not have any limitation.

Steps $S_{15}$ to $S_{151}$

When the contact status is identified to be the contact state according to the Steps $S_{130}$ to $S_{133}$, the processing unit 14 may calculate the displacement according to two of the valid images and adjust the light source parameter of the light source 12 according to the calculated displacement, such as the speed mode and skip number, and then return to the Step $S_{11}$ to perform the next operation cycle. The method of calculating a displacement according to two valid images is well known, e.g. calculating the displacement according to the correlation between images, and thus details thereof will not be repeated herein.

As mentioned above, the power saving method of conventional optical navigation devices has as a lower stability and a poor efficiency. The present disclosure further provides a displacement detection device (FIG. 1) and operating method thereof (FIGS. 5A to 5B) that may effectively reduce the system power consumption as well as eliminate interference from ambient light thereby improving the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, configured to detect a contact status and a displacement of a finger, the displacement detection device comprising:
   a touch interface configured as an operation interface in contact with the finger;
   a light source configured to provide light to penetrate the touch interface to the finger, the light source having a light source parameter;
   an image sensor configured to receive light reflected from the finger and penetrating the touch interface at a sampling frequency to output valid images when the light source is being turned on and output dark images when the light source is being turned off; and
   a processing unit configured to
      calculate a static parameter of a differential image between one of the dark images and one of the valid images,
      calculate a parameter difference between the static parameter and a predetermined parameter, wherein the predetermined parameter is obtained according to another differential image between another one of the dark images and another one of the valid images previously captured by the image sensor when the finger is not in contact with the touch interface,
      identify the contact status of the finger with respect to the touch interface switching between a contact state and a non-contact state when the parameter difference changes across at least one threshold, and
      calculate the displacement according to two of the valid images to accordingly adjust the light source parameter.

2. The displacement detection device as claimed in claim 1, wherein the light source parameter comprises a lighting frequency and a skip number.

3. The displacement detection device as claimed in claim 2, wherein the skip number is determined according to the displacement and a maximum detectable speed associated with the light source parameter.

4. The displacement detection device as claimed in claim 1, wherein the processing unit is further configured to adjust an exposure time and an amplification gain according to an image content of at least one of the valid images.

5. The displacement detection device as claimed in claim 1, wherein
   when the processing unit identifies that the contact status is in the non-contact state for a predetermined time interval, the processing unit is configured to control the displacement detection device to enter a sleep mode; and
   when the processing unit identifies that the contact status is the contact state, the processing unit is configured to calculate the displacement according to two of the valid images.

6. The displacement detection device as claimed in claim 1, wherein the static parameter and the predetermined parameter are brightness values or quality parameters.

7. The displacement detection device as claimed in claim 1, wherein, when the finger is not in contact with the touch surface, the light provided by the light source penetrates the touch interface without being reflected from the finger to the image sensor.

8. An operating method of a displacement detection device, the displacement detection device comprising a light source, an image sensor and a processing unit, and the displacement detection device being configured to detect a contact status between a finger and a touch interface, the operating method comprising the steps of:
   providing, by the light source, light penetrating the touch interface to the finger, the light source having a light source parameter;
   receiving, by the image sensor, light reflected from the finger and penetrating the touch interface at a sampling frequency to output valid images when the light source is being turned on and output dark images when the light source is being turned off;
   calculating, by the processing unit, a static parameter according to one of the valid images and one of the dark images; and
   identifying, by the processing unit, the contact status of the finger with respect to the touch interface switching between a contact state and a non-contact state when a parameter difference between the static parameter and a predetermined parameter changes across at least one threshold,
   wherein the predetermined parameter is obtained according to a differential image between another one of the dark images and another one of the valid images previously captured by the image sensor when the finger is not in contact with the touch interface.

9. The operating method as claimed in claim 8, wherein the operating method further comprises the steps of:
   in the non-contact state, switching to the contact state when the parameter difference is larger than a first threshold and maintaining the non-contact state when the parameter difference is smaller than the first threshold; and
   in the contact state, switching to the non-contact state when the parameter difference is smaller than a second threshold and maintaining the contact state when the parameter difference is larger than the second threshold, wherein the first threshold is larger than the second threshold.

10. The operating method as claimed in claim 9, further comprising the steps of:
   entering a sleep mode when the contact status is in the non-contact state for a predetermined time interval; and calculating a displacement according to two of the valid images when the contact status is the contact state.

11. The operating method as claimed in claim 10, further comprising the steps of:
   adjusting, by the processing unit, the light source parameter according to the displacement; and
   adjusting, by the processing unit, an exposure parameter according to an image content of at least one of the valid images.

12. The operating method as claimed in claim 11, wherein the light source parameter comprises a lighting frequency and a skip number; and
   the exposure parameter comprises an exposure time and an amplification gain.

13. The operating method as claimed in claim 12, wherein the skip number is determined according to the displacement and a maximum detectable speed associated with the light source parameter.

14. The operating method as claimed in claim 8, wherein the static parameter and the predetermined parameter are brightness values or quality parameters.

15. A displacement detection device, configured to detect a contact status of a finger, the displacement detection device comprising:
   a touch interface configured as an operation interface in contact with the finger;
   a light source configured to provide light to penetrate the touch interface to the finger, the light source having a light source parameter;
   an image sensor configured to receive light reflected from the finger and penetrating the touch interface at a sampling frequency to output valid images when the light source is being turned on and output dark images when the light source is being turned off; and
   a processing unit configured to calculate a brightness difference between one of the valid images and one of the dark images, and identify the contact status of the finger with respect to the touch interface switching between a contact state and a non-contact state when a difference between the brightness difference and a predetermined brightness difference changes across at least one threshold,
   wherein the predetermined brightness difference is a brightness difference between another one of the dark images and another one of the valid images previously captured by the image sensor when the finger is not in contact with the touch interface.

16. The displacement detection device as claimed in claim 15, wherein the light source parameter comprises a lighting frequency, a skip number of the valid images each time after capturing two of the valid images, and at least one exposure time.

17. The displacement detection device as claimed in claim 16, wherein the brightness difference and the predetermined brightness difference are obtained by dividing an average brightness difference between the valid and dark images by the exposure time, or obtained according to an equation of (an average brightness of the valid images/a first exposure time)−(an average brightness of the dark images/a second exposure time).

* * * * *